(12) United States Patent
Hsiao et al.

(10) Patent No.: US 12,251,920 B2
(45) Date of Patent: Mar. 18, 2025

(54) LAMINATED FILM

(71) Applicant: Inteplast Group Corporation, Livingston, NJ (US)

(72) Inventors: Tom Hsiao, Sugarland, TX (US); Frankie Lu, Port Lavaca, TX (US); Peng-Jen Chen, Victoria, TX (US); Hsin-Tien Tung, Edna, TX (US); Angel Herrera, Victoria, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 115 days.

(21) Appl. No.: 18/172,967

(22) Filed: Feb. 22, 2023

(65) Prior Publication Data
US 2023/0219323 A1    Jul. 13, 2023

Related U.S. Application Data

(63) Continuation of application No. 17/332,630, filed on May 27, 2021, now abandoned.

(60) Provisional application No. 63/032,005, filed on May 29, 2020.

(51) Int. Cl.
*B32B 7/035* (2019.01)
*B32B 27/08* (2006.01)
*B32B 27/32* (2006.01)

(52) U.S. Cl.
CPC .............. *B32B 7/035* (2019.01); *B32B 27/08* (2013.01); *B32B 27/32* (2013.01); *B32B 2250/24* (2013.01); *B32B 2307/518* (2013.01); *B32B 2307/54* (2013.01); *B32B 2307/558* (2013.01); *B32B 2307/581* (2013.01); *B32B 2307/5825* (2013.01); *B32B 2307/72* (2013.01)

(58) Field of Classification Search
CPC ......... B32B 7/035; B32B 27/08; B32B 27/32; B32B 2250/24; B32B 2307/518; B32B 2307/54; B32B 2307/558; B32B 2307/581; B32B 2307/5825; B32B 2307/72
USPC ........................................................ 156/349
See application file for complete search history.

(56) References Cited

U.S. PATENT DOCUMENTS

| | | |
|---|---|---|
| 4,870,122 A | 9/1989 | Lu |
| 4,916,025 A | 4/1990 | Lu |
| 5,223,346 A | 6/1993 | Lu |
| 5,500,283 A | 3/1996 | Kirk et al. |

(Continued)

FOREIGN PATENT DOCUMENTS

WO    2019156733 A1    8/2019

OTHER PUBLICATIONS

"Stenter Frame", ScienceDirect, 2022, 14 pages.
(Continued)

*Primary Examiner* — James D Sells
(74) *Attorney, Agent, or Firm* — Stinson LLP

(57) ABSTRACT

A multi-laminate film includes a first biaxially oriented film having a first machine direction angle and a first spiral cut oriented film having a second machine direction angle different than the first machine direction angle. The multi-laminate film also includes at least one of a second biaxially oriented film having the first machine direction angle or a second spiral cut oriented film. The first biaxially oriented film, the first spiral cut oriented film and the at least one of the second biaxially oriented film or second spiral cut oriented film are laminated together.

23 Claims, 3 Drawing Sheets

(56) References Cited

U.S. PATENT DOCUMENTS

| | | |
|---|---|---|
| 6,787,206 B2 | 9/2004 | Rasmussen |
| 9,278,507 B2 * | 3/2016 | Rancich ................. B32B 27/32 |
| 9,676,169 B2 | 6/2017 | Paulino |
| 9,724,801 B2 | 8/2017 | Gu |
| 2014/0048202 A1 | 2/2014 | Pethaperumal et al. |
| 2018/0099492 A1 | 4/2018 | Yun et al. |

OTHER PUBLICATIONS

"Biaxially Oriented Polyethylene (BOPE) Films Fabricated via Tenter Frame Process and Applications Thereof", Yijian Lin, et al., DowDuPont, undated, received by Applicant Aug. 26, 2022, 21 pages.

* cited by examiner

LAMINATED FILM

CROSS-REFERENCE TO RELATED APPLICATIONS

The present application is a continuation of U.S. application Ser. No. 17/332,630, filed May 27, 2021, which claims priority to U.S. Provisional Application No. 63/032,005, filed May 29, 2020, the entireties of which are hereby incorporated by reference.

FIELD

The present disclosure generally relates to laminated films and, in particular, laminated films comprised of spiral cut and biaxially oriented films.

BACKGROUND

Plastic films are commonplace today and are used to create plastic bags, adhesive tapes, etc. Such plastic films include spiral-cut oriented (SC) films and biaxially oriented (BO) films.

SUMMARY

In one aspect, a multi-laminate film comprises a first biaxially oriented film having a first machine direction angle. A first spiral cut oriented film has a second machine direction angle different than the first machine direction angle. The multi-laminate film also comprises at least one of a second biaxially oriented film having the first machine direction angle or a second spiral cut oriented film. The first biaxially oriented film, the first spiral cut oriented film and the at least one of the second biaxially oriented film or second spiral cut oriented film are laminated together.

In another aspect, a multi-laminate film comprises a plurality of films laminated together. Each film has a machine direction angle. The machine direction angles of at least two films of the plurality of films are different from each other.

Other objects and features of the present disclosure will be in part apparent and in part pointed out herein.

BRIEF DESCRIPTION OF THE FIGURES

Corresponding reference characters indicate corresponding parts throughout the drawings.

DETAILED DESCRIPTION OF PREFERRED EMBODIMENTS

The films disclosed according to this disclosure are multi-laminate films made from multiple films (e.g., plies) laminated or joined together. Each ply of film is preferably one of either a spiral-cut oriented film (SC film) or a biaxially oriented film (BO film). BO film refers to film that is oriented in two directions, the machine direction (e.g., generally parallel to the longitudinal axis LA of the film) and the cross machine direction. That is, after extrusion, the film is stretched in both the machine direction and the cross machine direction. As a reference point, BO film has a machine direction angle of about 0° (e.g., the machine direction angle is parallel to the machine direction or longitudinal axis LA of the film). SC film refers to film that is oriented in a direction other than the machine direction or cross machine direction (e.g., at an angle to the longitudinal axis LA of the film). That is, after extrusion, the direction the film was stretched in or has been oriented at an angle to the longitudinal axis LA of the film. Relative to BO films, the SC films have machine direction angles other than 0° such as +45° (relative to 0°) or −45° (relative to 0°). Preferably, the SC films have a machine direction angle between the inclusive range of about 30° to about 60° (e.g., a range of about 30° to 60° relative to 0° or about −30° to −60° relative to 0°). It is understood the SC films disclosed herein can have any machine direction angle between the inclusive range of about 30° to about 60°. The use of films of other orientations and orientations types are within the scope of the present disclosure.

Figure 1:
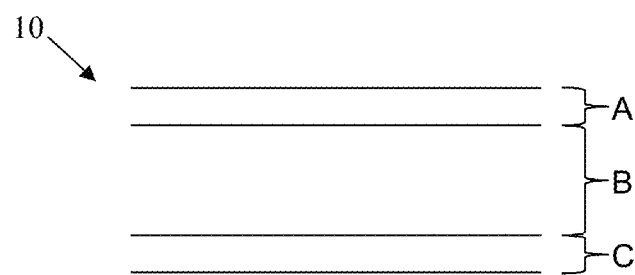
FIG. 1 is a schematic illustration of one embodiment of a film of the present disclosure.

Referring to FIG. 1, a schematic illustration of an individual film 10 is shown that can be combined with other such individual films to form the multi-laminate films of the present disclosure (e.g., multi-laminate films 100, 200). The film 10 shown in FIG. 1 can be either a SC film or a BO film. The film 10 includes multiple layers A, B, C. Preferably, each layer A, B, C is made of either high density polyethylene (HDPE) or linear low density polyethylene (LLDPE), although other suitable materials are within the scope of the present disclosure. In the illustrated embodiment, the film 10 includes three layers A, B, C (broadly, at least three layers), although more layers are within the scope of the present disclosure. The film 10 includes two outer skin layers A, C with a core layer B disposed there-between. The two outer skin layers A, C are preferably about 2 µm thick. Accordingly, the bulk of the thickness of the film 10 comes from the core layer B which also generally determines the mechanical (e.g., strength) properties of the film. In an embodiment, a BO film may have a core layer B having a thickness of about 1 mil, although other thicknesses are within the scope of the present disclosure. In addition, the thickness of the core layer B (and the overall thickness of the individual film 10) can vary depending on the desired overall thickness of the multi-laminate film of which the individual film is a part. In one embodiment where the film 10 is an SC film, the two outer skin layers A, C are LLDPE and the core layer B is HDPE. In one embodiment of where the film 10 is a BO film, the skin layers A, C are preferably an LLDPE with antiblock, such as a silica based antiblock (e.g., Dow C8 Metallocene with 4,000 ppm silica antiblock), to prevent the film sticking with itself (when it is wound up) or with other films. In one embodiment, one or both of the skin layers A, C may undergo a corona treatment as desired in order to improve the ink adhesion of the surface of the film 10. It is understood that all the layers of the film 10 (e.g., skin layers A, C and core layer B) are oriented in same direction. In one embodiment, the film 10 is an SC film that includes skin layers A, C of LLDPE with antiblock and a core layer B of HDPE. In one embodiment, the film 10 is a BO film that includes skin layers A, C of LLDPE with antiblock and a core layer B of LLDPE. In another embodiment, the core layer B of the BO film 10 may be HDPE. The layers A, B, C and the BO and SC films 10 can be any combinations of LLDPE and HDPE. The BO and SC films 10 may be prepared by a suitable process, such as a conventional continuous extrusion processes. As used herein, an individual film 10 that is a BO film is designated by reference numeral "10A" and an individual film 10 that is a SC film is designated by reference numeral "10B." Reference numeral "10" is used to designate an individual film generally (e.g., any type of individual film).

Figure 2:
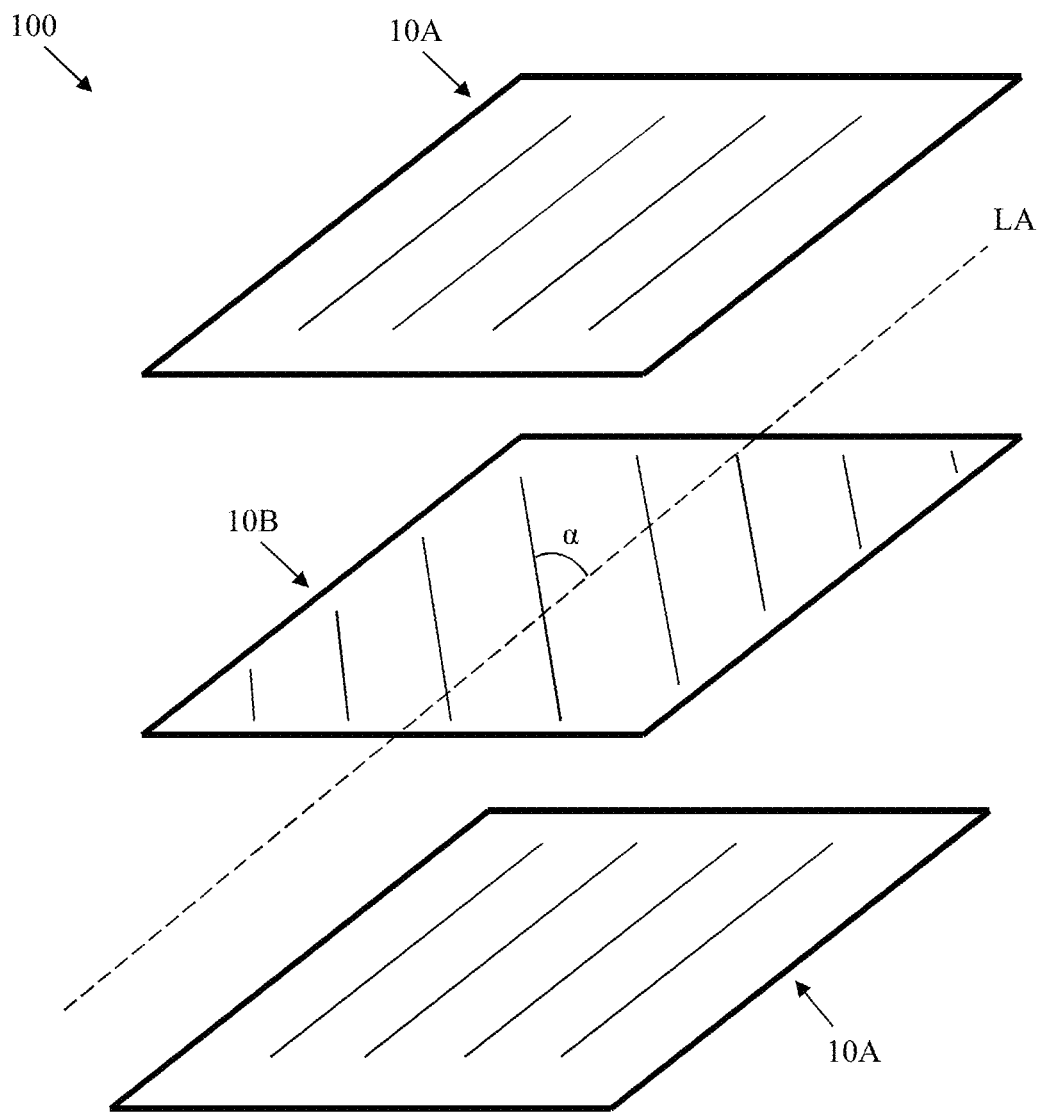
FIG. 2 is a schematic exploded illustration of one embodiment of a multi-laminate film according to one embodiment of the present disclosure.
Figure 3:
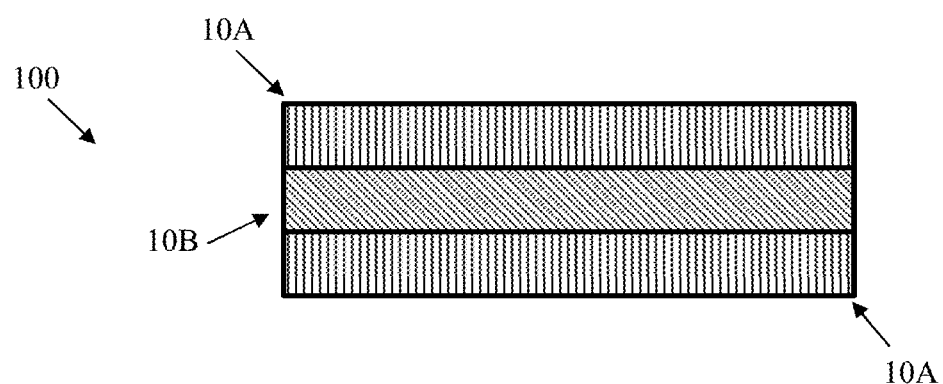
FIG. 3 is a schematic illustration of the multi-laminate film of FIG. 2.
Figure 4:
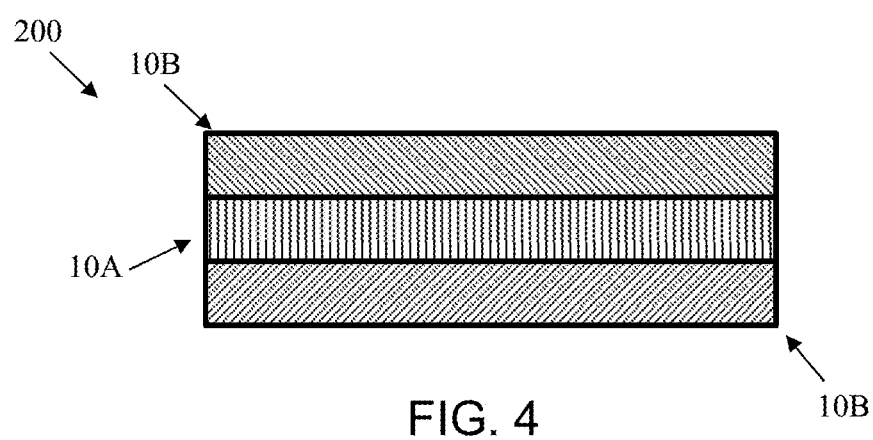
FIG. 4 is a schematic illustration of a multi-laminate film according to another embodiment of the present disclosure.

Referring to FIGS. 2-4, multi-laminate films 100 of the present disclose are formed by layering different BO films 10A and SC films 10B together. The BO films 10A and SC films 10B are laminated together in a suitable manner such as by using heat lamination, as is generally known in the art. Generally speaking, the multi-laminate film 100 is formed by laminating BO and SC films 10A, 10B together such that no two adjacent individual films 10 have the same machine direction angle. The multi-laminate film 100 can include any number of individual films 10 laminated together. For example, the multi-laminate film can include between the inclusive range of three to nine films 10 layered together. Each multi-laminate film will include one (e.g., a first) BO film 10A, one (e.g., a first) SC film 10B and at least one of another (e.g., second, third, fourth, fifth, etc.) BO film(s) and/or another (e.g., second, third, fourth, fifth, etc.) SC film(s). For example, in the embodiment illustrated in FIGS. 2 and 3, the multi-laminate film 100 includes two BO films 10A and one SC film 10B laminated together. As mentioned above, the BO films 10A have a machine direction angle (e.g., a first machine direction angle) of generally 0° (e.g., parallel to the longitudinal axis LA). In this embodiment, the SC film 10B has a machine direction angle α (e.g., a second machine direction angle) of any number within the inclusive range of about +30° to about +60°, such as about +57.6°, about +45°, about +45.8°, about +38.9°, or about +33.2°, although other angles are within the scope of the present disclosure. For example, the SC film 10A may have a negative machine direction angle, such as about −45°, in one embodiment. In the illustrated embodiment, the +45° SC film 10B is disposed (e.g., sandwiched or laminated) between the two BC films 10A. As used herein, a positive angle refers to an angle taken on one (e.g., left) side of (e.g., in a counterclockwise direction from) the longitudinal axis LA (e.g., 0°) and a negative angle refers to an angle taken on the other (e.g., right) side of (e.g., in a clockwise direction from) the longitudinal axis. The SC films 10B of the present disclosure can have a positive or negative machine orientation angle in any layer or ply of the multi-laminate film. In the illustrated embodiments, the machine directions of the BO and SC films 10A, 10B are schematically represented by thin, solid black lines.

Referring to FIG. 4, another embodiment of a multi-laminate film is generally indicated by reference numeral 200. In the embodiment, the multi-laminate film 200 includes two SC films 10B and a BO film 10A laminated together. The BO film 10A has a machine direction angle of 0°, the upper SC film 10B has a machine direction angle of any number within the inclusive range of about +30° to about +60°, as mentioned above, and the lower SC film 10B has a machine direction angle of any number within the inclusive range of about −30° to about −60°. For example, the upper SC film 10B can have a machine direction angle of about +45° and the lower SC film 10B can have a machine direction angle of about −45°. In other embodiments, the two SC films 10B may both have the same machine direction angle (e.g., either +45° or −45°). The BO film 10A is disposed between the two SC films.

In one embodiment, the multi-laminate film may include more than three layers, and alternate between layers of SC films 10B and BO films 10A. In another embodiment, the multi-laminate films may alternate between layers of SC films 10B having different machine angles. For example, two SC films 10B can be adjacent to one another as long as they have different machine angles and, preferably, machine angles that are the opposite (e.g., positive and negative) of one another, such as +45° and −45°.

Using the principles outlined herein, it is possible to come up with any number of different permutations of SC and BO films 10B, 10A to form a multi-laminate film. Some of these different permutations are listed below in Table 1 (all BO films 10A have a machine orientation angle of 0°). The order of the individual films 10 in the multi-laminate film is given from left to right (e.g., upper most film to lower most film).

TABLE 1

Exemplary Multi-Laminate Film Permutations

| Number of Film Layers | Arrangement and Orientation of BO and SC Films |
|---|---|
| 3 | BO/+45°SC/BO (as shown in FIGS. 2 and 3) |
| 3 | +45°SC/BO/−45°SC (as shown in FIG. 4) |
| 4 | +30°SC/BO/−30°SC/BO |
| 4 | BO/−60°SC/+60°SC/BO |
| 5 | BO/+35°SC/BO/−35°SC/BO |
| 5 | +50°SC/−50°SC/BO/−40°SC/+40°SC |
| 6 | BO/+45°SC/−45°SC/BO/+45°SC/−45°SC |
| 6 | +30°SC/BO/−30°SC/+60°SC/BO/−60°SC |
| 7 | BO/+45°SC/BO/−45°SC/BO/+45°SC/BO |
| 7 | +55°SC/BO/−55°SC/BO/+35°SC/BO/−35°SC |
| 8 | BO/−50°SC/+35°SC/−45°SC/+45°SC/−35°SC/+50°SC/BO |
| 8 | BO/+60°SC/BO/−30°SC/+30°SC/BO/−60°SC/BO |
| 9 | BO/+45°SC/BO/−45°SC/BO/+45°SC/BO/−45°SC/BO |
| 9 | −30°SC/+30°SC/BO/+45°SC/−45°SC/BO/+60°SC/−60°SC |

These different permutations of multi-laminate films are exemplary only, and other permutations are within the scope of the present disclosure. Accordingly, the multi-laminate films of the present disclosure generally (and broadly) includes a plurality of films 10 laminated together (e.g., one on top of another and so on). Each film 10 has a machine direction angle α. The machine direction angles α of at least two films 10 of the plurality of films are different from each other in the multi-laminate films of the present disclosure. Preferably, the films 10 are arranged such that no two adjacent films of the plurality of films have the same machine direction angle α (e.g., one film has a machine direction angle that is different than the machine direction angle of a film immediately above said one film and that is different than the machine direction angle of a film immediately above said one film). Desirably, each film 10 of the plurality of films is either a biaxially oriented film 10A or a spiral cut oriented film 10B. The multi-laminate film can include one or more (e.g., at least two) biaxially oriented films 10A. For example, the multi-laminate film can include one, two, three, four, five, etc. biaxially oriented films 10A. Likewise, the multi-laminate film can include one or more (e.g., at least two) spiral cut oriented films 10B. For example, the multi-laminate film can include one, two, three, four, five, six, seven, eight, etc. spiral cut oriented films 10B. Where the multi-laminate film includes multiple spiral cut oriented films 10B, the machine directions angles α for the spiral cut oriented films can all be the same, can all be different, or some of the machine directions angles can be the same. In one embodiment, the films 10 in the multi-laminate film are arranged to alternate between biaxially and spiral cut oriented films 10A, 10B (e.g., biaxially oriented film, spiral cut oriented film, biaxially oriented film, spiral cut oriented film and so on (depending on the total number of films)).

The multi-laminate film can be of generally any thickness. For example, a three film multi-laminate film 100 as shown in FIGS. 2-4 can have a thickness of 3 mils, 3.5 mils or 4 mils. The thickness of the multi-laminate film depends on the thickness of the SC and BO films 10B, 10A comprising the multi-laminate films. The SC and BO films 10B, 10A may have generally the same or different thicknesses. The relative thicknesses of the SC film(s) 10B and BO film(s) 10A in the multi-laminate film can be varied as desired in order to vary the mechanical properties of the film to be closer to those of individual SC films 10B or those of individual BO films 10A.

Multi-laminate films of the present disclosure possess superior mechanical (e.g., strength) properties over conventional multi-laminate films. It is believed the layering of films 10 with different machine angles strengthens the multi-laminate film. Also, the multi-laminate films of the present disclosure experience little to no twist curling. The presence of multiple layered films 10 of different machine angles is believed to resist or counteract the internal forces within the multi-laminate film that can cause twist curling.

Example 1

Figure 5:
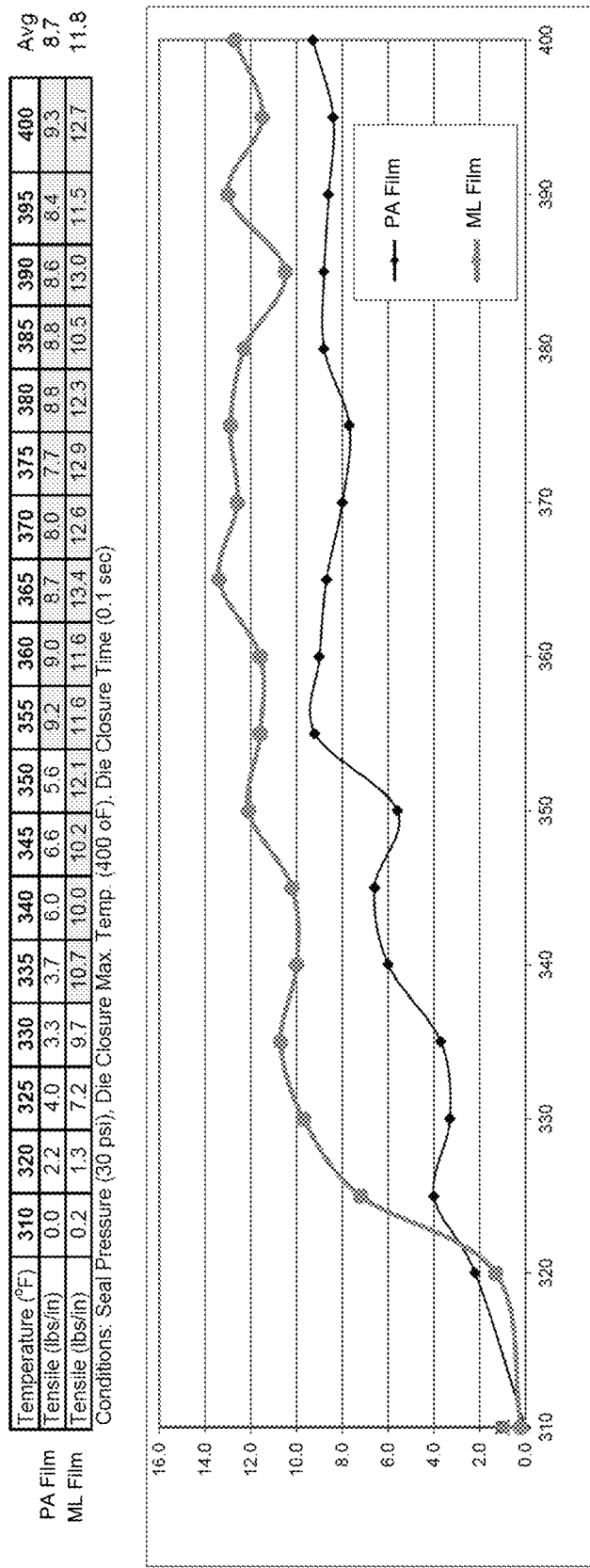
FIG. 5 is a Heat Seal Strength Curve comparing a multi-laminate film according to one embodiment of the present disclosure to a commercially available prior art film.

In one example, a multi-laminate film of the present disclosure was prepared and tested for mechanical properties in comparison to a corresponding commercially available prior art film. The multi-laminate film of the present disclosure tested was similar to the multi-laminate film 100 shown in FIGS. 2 and 3. The tested multi-laminate film comprised two outer layers of BO film with a SC film having a machine direction angle of +57.6° therebetween. The prior art film was a commercial available spiral cut cross laminated film (e.g., the prior art film does not include a BO film layer). As shown in FIG. 5, which is a Heat Seal Strength Curve (Theiler Sealer) comparing the two films, the tested multi-laminate film (designated as "ML Film"), constructed according to the teachings of the present disclosure, has a higher seal strength and a larger seal window then the prior art film (designated as "PA Film"). Thus, the tested multi-laminate film, constructed according to the teachings of the present disclosure, provides a stronger seal and larger seal window then comparable prior art films. The table boxes with light gray shading are numbers in the chart that indicate the seal window for a specified target strength.

Examples 2-4

In additional examples, three multi-laminate films constructed according to the teachings of the present disclosure of different thicknesses were prepared and tested for mechanical properties in comparison to corresponding commercially available prior art films of comparable thicknesses. The multi-laminate films of the present disclosure tested were the same as shown in FIGS. 2 and 3. Each multi-laminate film 100 comprised two outer layers of BO Film with a SC film layer therebetween having a machine direction angle as indicated below. The prior art films were commercial available spiral cut cross laminated films of similar thicknesses to the multi-laminate film. Each multi-laminate film was compared against spiral cut cross laminated films having two SC film layers (e.g., two plies) and four SC film layers (e.g., four plies).

For the following tables, the column heading "3 plies (2BE+SC)" is a multi-laminate film according to the present disclosure (this column has a light gray background), the column heading "2 plies" is a prior art film having two SC film layers and the column heading "4 plies" is a prior art film having four SC film layers. "BE" stands for a BO film 10A.

Table 2, below, shows the test results for a multi-laminate film with a thickness of 3 mils in comparison with corresponding prior art films of similar thicknesses. In this example, the SC film had a machine direction angle of +57.6°.

TABLE 2

| | | | 2 plies | 3 plies (2BE + SC) | 4 plies |
|---|---|---|---|---|---|
| THICKNESS (mils) | Internal | | 3.2 | 3.0 | 3.0 |
| THICKNESS (GSM) | ASTM-5261 | | 74.4 | 70.4 | 70.8 |
| TENSILE @ ULT (lbs/in) | ASTM D882 | MD | 16.9 | 21.8 | 18.2 |
| | | TD | 15.9 | 37.9 | 15.6 |
| TENSILE @ ULT (PSI) | ASTM D882 | MD | 6,253 | 7,295 | 6,114 |
| | | TD | 5,582 | 12,683 | 5,238 |
| ELONGATION @ ULT (%) | ASTM D882 | MD | 685 | 341 | 690 |
| | | TD | 675 | 108 | 800 |
| DART IMPACT (grams) | ASTM D1709 | METH-OD A | 641 | 1,415 | 431 |
| DELAMINATION (lbs/in) | ASTM D882 | | 2.6 | 0.2 1.36 | 1.7 |
| ELMENDORF TEAR (grams) | ASTM D1922 | MD | 3,656 | 90 | 527 |
| | | TD | 4,006 | 80 | 1,384 |
| PUNCTURE-PROP. TEAR (grams) Sled: 1 lb | ASTM D2582 | MD | 7,866 | 2,647 | 5,585 |
| | | TD | 8,110 | <1717 | 6,640 |
| | | | twist curl | no twist curl | no twist curl |

Table 3, below, shows the test results for a multi-laminate film with a thickness of 3.5 mils in comparison with corresponding prior art films of similar thicknesses. In this example, the SC film had a machine direction angle of +57.6°.

TABLE 3

| | | | 2 plies | 3 plies (2BE + SC) | 4 plies |
|---|---|---|---|---|---|
| THICKNESS (mils) | Internal | | 3.6 | 3.5 | 3.4 |
| THICKNESS (GSM) | ASTM-5261 | | 84.5 | 84.8 | 81.1 |
| TENSILE @ ULT (lbs/in) | ASTM D882 | MD | 21.4 | 24.5 | 21.8 |
| | | TD | 20.5 | 37.8 | 16.4 |
| TENSILE @ ULT (PSI) | ASTM D882 | MD | 5,975 | 7,037 | 6,394 |
| | | TD | 5,735 | 10,857 | 4,795 |
| ELONGATION @ ULT (%) | ASTM D882 | MD | 851 | 116 | 697 |
| | | TD | 699 | 265 | 835 |
| DART IMPACT (grams) | ASTM D1709 | METH-OD A | 564 | 1,691 | 544 |
| DELAMINATION (lbs/in) | ASTM D882 | | 2.4 | 0.7 1.5 | 3.0 |
| ELMENDORF | ASTM | MD | 4,523 | 116 | 578 |

TABLE 3-continued

|  |  |  | 2 plies | 3 plies (2BE + SC) | 4 plies |
|---|---|---|---|---|---|
| TEAR (grams) | D1922 | TD | 5,198 | 265 | 1,382 |
| PUNCTURE-PROP. | ASTM | MD | 8,320 | 2,773 | 6,750 |
| TEAR (grams) Sled: 1 lb | D2582 | TD | 8,130 | <1717 | 8,861 |
|  |  |  | twist curl | no twist curl | no twist curl |

Table 4, below, shows the test results for a multi-laminate film with a thickness of 4 mils in comparison with corresponding prior art films of similar thicknesses. In this example, the SC film had a machine direction angle of 45.8°.

TABLE 4

|  |  |  | 2 plies | 3 plies (2BE + SC) | 4 plies |
|---|---|---|---|---|---|
| THICKNESS (mils) | Internal |  | 4.2 | 4.0 | 4.1 |
| THICKNESS (GSM) | ASTM-5261 |  | 94.5 | 94.8 | 92.8 |
| TENSILE @ ULT (lbs/in) | ASTM D882 | MD | 22.8 | 26.3 | 28.4 |
|  |  | TD | 21.9 | 35.1 | 20.8 |
| TENSILE @ ULT (PSI) | ASTM D882 | MD | 5,485 | 6,614 | 6,917 |
|  |  | TD | 5,267 | 8,821 | 5,069 |
| ELONGATION @ ULT (%) | ASTM D882 | MD | 709 | 260 | 551 |
|  |  | TD | 672 | 107 | 751 |
| DART IMPACT (grams) | ASTM D1709 | METHOD A | 570 | 1,621 | 825 |
| DELAMINATION (lbs/in) | ASTM D882 |  | 5.0 | 0.46 0.62 | 6.6 |
| ELMENDORF TEAR (grams) | ASTM D1922 | MD | 3,244 | 220 | 1,411 |
|  |  | TD | 3,963 | 370 | 4,122 |
| PUNCTURE-PROP. TEAR (grams) Sled: 1 lb | ASTM D2582 | MD | 9,174 | 2,273 | 8,149 |
|  |  | TD | 9,484 | 5,565 | 10,524 |
|  |  |  | twist curl | no twist curl | no twist curl |

The results show that the multi-laminate films of the present disclosure have superior mechanical properties over the commercially available prior art films of similar thicknesses. As can be seen, the multi-laminate films of the present disclosure possessed greater tensile strengths than the prior art films and have less elongation. The multi-laminate films of the present disclosure also can withstand a greater impact than the prior art films. The multi-laminate films of the present disclosure also do not twist cure, unlike the prior art films having only two layers of SC film. The tests for the different mechanical properties were conducted under the appropriate ASTM standard as indicated in the tables above.

Examples 5-8

In additional examples, four multi-laminate films of the present disclosure of different thicknesses and different film arrangements were prepared and tested for mechanical properties. Film 1 (Item Number RXVT202-1) comprised two layers of BO film 10A with a SC film 10B therebetween (e.g., a multi-laminate film 100 as show in FIGS. 2 and 3) having a machine direction angle of +33.2° and an overall thickness of 2.7 mils. Film 2 (Item Number RXVT101-2) comprised two layers of BO film 10A with a SC film 10B therebetween (e.g., a multi-laminate film 100 as show in FIGS. 2 and 3) having a machine direction angle of +57.6° and an overall thickness of 3.7 mils. Film 3 (Item Number RXVT204-1) comprised two layers of SC film 10B, each having the same machine orientation angle of −38.9°, with a BO film 10A therebetween and an overall thickness of 2.8 mils. Film 4 (Item Number RXVT206-1) comprised two layers of SC film 10A, each having the same machine orientation angle of −38.9°, with a BO film 10A therebetween and an overall thickness of 3.7 mils. Table 5 below shows the test results for these different multi-laminate films of the present disclosure.

TABLE 5

|  |  |  | BE + SC + BE | BE + SC + BE | SC + BE + SC | SC + BE + SC |
|---|---|---|---|---|---|---|
| Order-item # |  |  | RXVT202-1 | RXVT101-2 | RXVT204-1 | RXVT206-1 |
| Roll ID: |  |  | 00210V01LB2 | 00201IV01LB1 | 00210IV01LB1 | 00304HV01001 |
| RECIPE |  |  | WPHWT07 22 μm | TGLWT01-54 um | WPHWT07 22 μm | PWHKAOB 39 um |
| THICKNESS (mils) | Internal |  | 2.7 | 3.7 | 2.8 | 3.7 |
| THICKNESS (μ) | ASTM |  | 69.11 | 94.39 | 70.35 | 95.1 |
| Thickness STD dev | D5199 |  | 2.64 | 2.17 | 2.68 | 4.0 |
| Thickness STD dev (%) | D5199 |  | 3.8% | 2.3% | 3.8% | 4.2% |
| THICKNESS (GSM) | ASTM-5261 |  | 65.7 | 93.7 | 65.1 | 88.7 |
| TENSILE @ ULT (lbs/in) | ASTM D882 | MD | 21.4 | 24.8 | 18.2 | 23.6 |
|  |  | TD | 37.8 | 40.3 | 26.1 | 23.4 |
| TENSILE @ ULT (PSI) | ASTM D882 | MD | 7,847 | 6,660 | 6,571 | 6,303 |
|  |  | TD | 13,893 | 10,831 | 9,423 | 6,250 |
| ELONGATION @ ULT (%) | ASTM D882 | MD | 250 | 250 | 322 | 350 |
|  |  | TD | 82 | 100 | 93 | 157 |
| DART IMPACT (grams) | ASTM D1709 | METHOD A | 1,384 | 1,691 | 1,064 | 876 |
| DELAMINATION (lbs/in) | ASTM D882 |  | 0.24 0.30 | 0.40 0.30 | 0.31 0.92 | 0.26 0.32 |
| ELMENDORF TEAR (grams) | ASTM D1922 | MD | 78 | 199 | 107 | 862 |
|  |  | TD | 55 | 326 | 140 | 157 |
| PUNCTURE-PROP. TEAR (grams) Sled: 1 lb | ASTM D2582 | MD | <1717 | <1717 | <1717 | 3,224 |
|  |  | TD | <1717 | <1717 | 3624 | 5,347 |
| TONGUE TEAR (lbs) | ASTM D1938 | MD | 2.5 | 3.1 | 2.63 | 5.59 |
|  |  | TD | 2.1 | 4.2 | 3.06 | 7.56 |

TABLE 5-continued

|  |  |  | BE + SC + BE | BE + SC + BE | SC + BE + SC | SC + BE + SC |
|---|---|---|---|---|---|---|
| GRAVES TEAR | ASTM | MD | 4.1 | 5.2 | 5.17 | 6.81 |
| (lbs) | D1004 | TD | 4.2 | 6.1 | 4.12 | 6.94 |
| Water Bath (%) | ASTM | MD | −2.0 | −3.5 | −3.6 | −5.4 |
| @ 180 F.(82 C.) × 1 min | D1204 | TD | 2.6 | 2.0 | 2.8 | 4.6 |

The physical properties of films 1-4 can be compared to the commercially available prior art films described in Tables 2-4. As can be seen, the results again show that the multi-laminate films of the present disclosure have superior mechanical properties over the commercially available prior art films of similar thicknesses (e.g., comparing the 2.7 mil thick Film 1 to the 3 mil thick prior art films of Table 2). As can be seen, the multi-laminate films of the present disclosure possessed greater tensile strengths than the prior art films and have less elongation. The multi-laminate films of the present disclosure also can withstand a greater impact than the prior art films. The tests for the different mechanical properties of films were conducted under the appropriate ASTM standard as indicated in the table above.

As used herein, terms of degree such as "about" and "generally" mean plus or minus 10%. For example, about 30 degrees means 30 degrees plus or minus 3 degrees (e.g., 27-33 degrees).

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A method of making a multi-laminate film comprising:
    positioning a first biaxially oriented film for lamination, the first biaxially oriented film having a first machine direction angle, and a first cross machine direction angle perpendicular to the first machine direction angle;
    positioning a first spiral cut oriented film for lamination, the first spiral cut oriented film having a second machine direction angle different than the first machine direction angle and the first cross machine direction angle; and
    positioning at least one of a second biaxially oriented film or a second spiral cut oriented film for lamination, the second biaxially oriented film having the first machine direction angle;
    laminating the first biaxially oriented film, the first spiral cut oriented film and the at least one of the second biaxially oriented film or second spiral cut oriented film together;
    wherein the first biaxially oriented film has the first machine direction angle and the first cross machine direction angle prior to lamination with the first spiral cut oriented film and the one of the second biaxially oriented film or second spiral cut oriented film.

2. The method of claim 1, wherein the at least one of the second biaxially oriented film or second spiral cut oriented film is the second biaxially oriented film, and wherein the step of laminating comprises laminating the first spiral cut oriented film between the first and second biaxially oriented films.

3. The method of claim 1, wherein the at least one of the second biaxially oriented film or second spiral cut oriented film is the second spiral cut oriented film, and wherein the step of laminating comprises laminating the first biaxially oriented film between the first and second spiral cut oriented films.

4. The method of claim 3, wherein the second spiral cut oriented film has the second machine direction angle.

5. The method of claim 3, wherein the second spiral cut oriented film has a third machine direction angle different than the first and second machine direction angles.

6. The method of claim 5, wherein the second machine direction angle is within the inclusive range of about +30° to about +60° and the third machine direction angle is within the inclusive range of about −30° to about −60°.

7. The method of claim 1, wherein the second machine direction angle is within the inclusive range of about +30° to about +60°.

8. The method of claim 1, wherein the second machine direction angle is within the inclusive range of about −30° to about −60°.

9. The method of claim 1, wherein the first biaxially oriented film, the first spiral cut oriented film and the at least one of the second biaxially oriented film or second spiral cut oriented film each comprise high density polyethylene (HDPE) or linear low density polyethylene (LLDPE).

10. The method of claim 1, wherein the first biaxially oriented film, the first spiral cut oriented film and the at least one of the second biaxially oriented film or second spiral cut oriented film each comprise two skins layers and a core layer disposed between the two skins layers.

11. A method of making a multi-laminate film comprising:
    positioning a first biaxially oriented film for lamination, the first biaxially oriented film having a first machine direction angle, and a first cross machine direction angle perpendicular to the first machine direction angle;
    positioning a first spiral cut oriented film for lamination, the first spiral cut oriented film having a second machine direction angle different than the first machine direction angle and the first cross machine direction angle; and
    positioning a second biaxially oriented film for lamination, the second biaxially oriented film having the first machine direction angle;
    laminating the first biaxially oriented film, the first spiral cut oriented film and the second biaxially oriented film together to form a laminated film having the first spiral cut oriented film located between the first biaxially oriented film and the second biaxially oriented film;
    wherein the first biaxially oriented film has the first machine direction angle and the first cross machine direction angle prior to lamination with the first spiral cut oriented film and the second biaxially oriented film;

wherein the seal strength of the laminated film when sealed to itself with a die at a temperature of about 335° F., forming a seal using a seal pressure of about 30 psi and a die closure time of about 0.1 seconds is at least about 10 lbs/in.

12. The method of claim 11 wherein the seal strength of any seal formed by attaching the laminated film to itself by a die using a seal pressure of about 30 psi, a die closure time of about 0.1 seconds and a die temperature between 330° F. and 400° F. is greater than or equal to 10 lbs/in.

13. The method of claim 11 wherein the thickness of the laminated film is about 3 mils.

14. The method of claim 13 wherein the ultimate tensile strength of the laminated film in the machine direction is greater than 20 lbs/in.

15. The method of claim 14 wherein the ultimate tensile strength of the laminated film in the machine direction is about 22 lbs/in.

16. The method of claim 13 wherein the ultimate tensile strength of the laminated film in the cross machine direction is greater than 18 lbs/in.

17. The method of claim 16 wherein the ultimate tensile strength of the laminated film in the cross machine direction is about 38 lbs/in.

18. The method of claim 13 wherein the ultimate elongation of the laminated film in the machine direction is less than 600%.

19. The method of claim 18 wherein the ultimate elongation of the laminated film in the machine direction is about 340%.

20. The method of claim 19 wherein the ultimate elongation of the laminated film in the cross machine direction is about 108%.

21. The method of claim 13 wherein the dart impact of the laminated film is greater than 700 grams.

22. The method of claim 21 wherein the dart impact of the laminated film is about 1,400 grams.

23. The method of claim 11 wherein the second machine direction angle of the spiral cut oriented film is about +57.6°.

* * * * *